March 28, 1939.  C. H. VEEDER  2,152,394
ASTRONOMICAL MIRROR
Filed Feb. 1, 1937  2 Sheets-Sheet 1
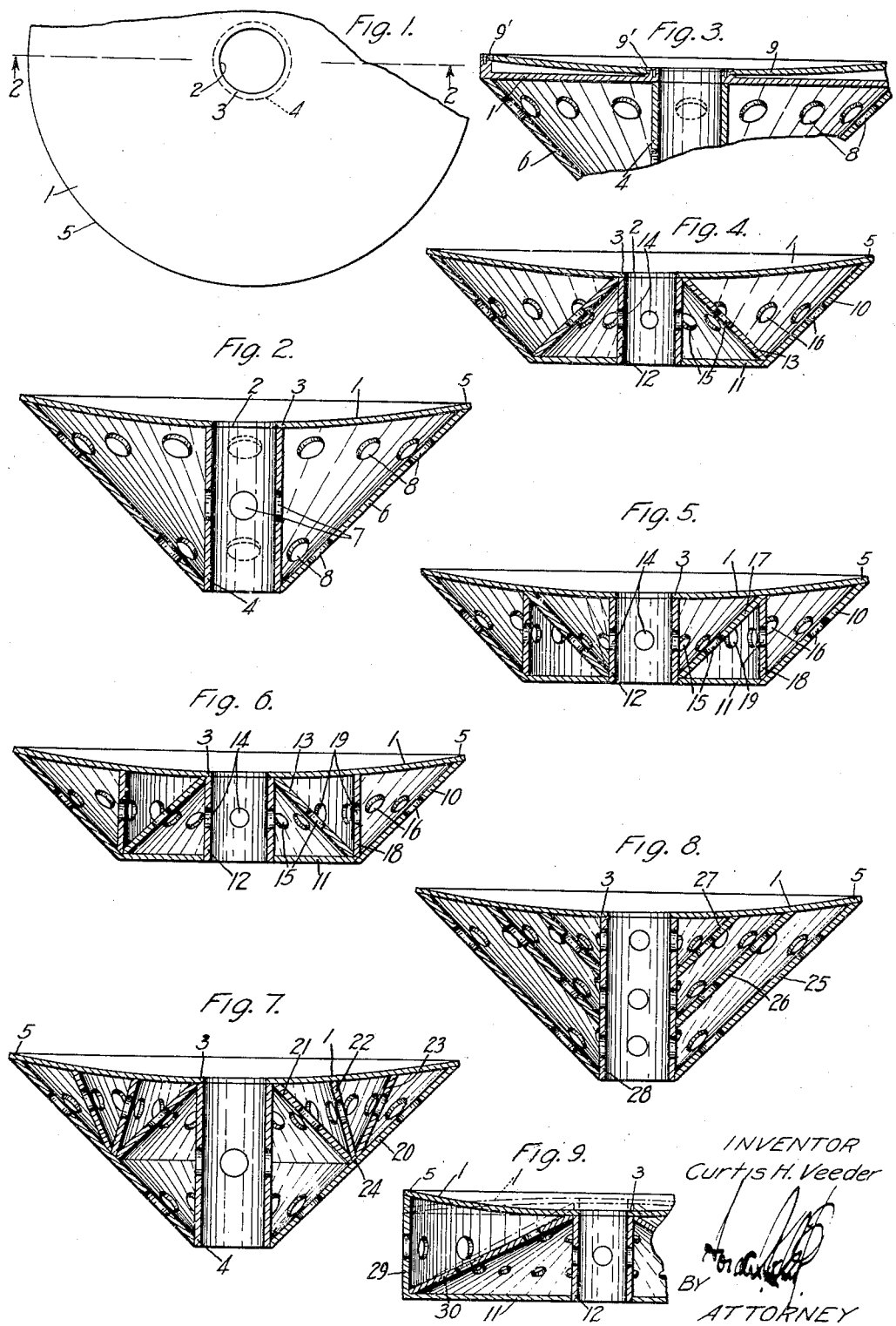
INVENTOR
Curtis H. Veeder
BY
ATTORNEY March 28, 1939.  C. H. VEEDER  2,152,394
ASTRONOMICAL MIRROR
Filed Feb. 1, 1937  2 Sheets-Sheet 2
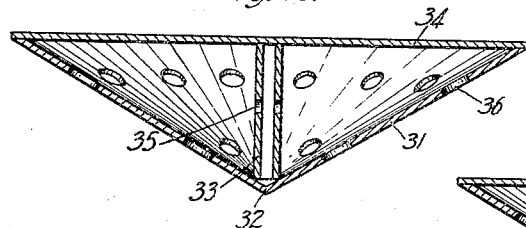
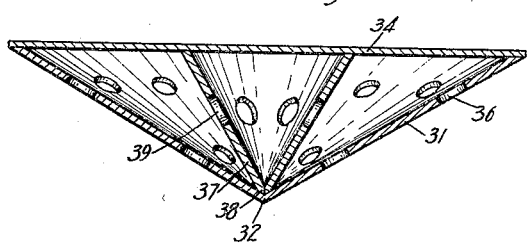
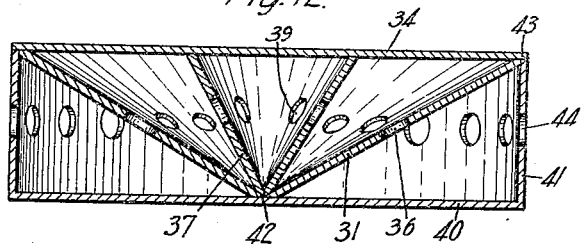
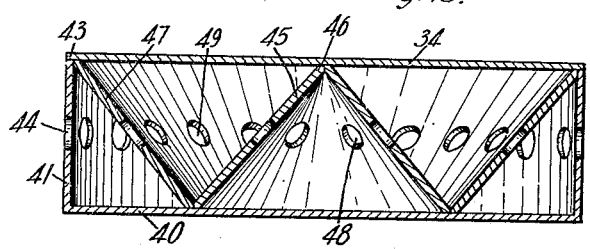
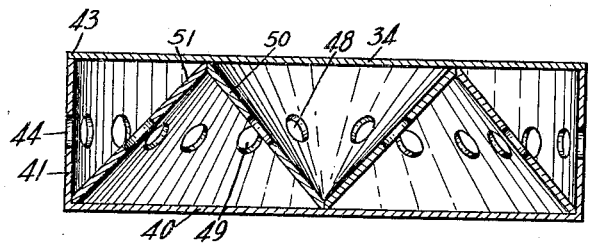
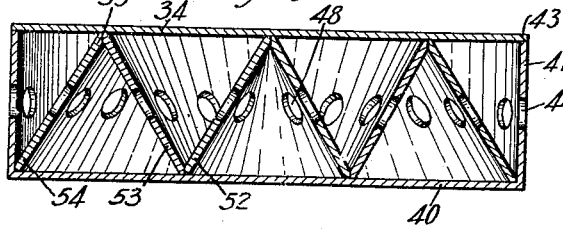
INVENTOR
Curtis H. Veeder
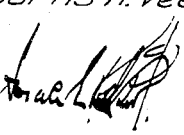
BY
ATTORNEY Patented Mar. 28, 1939

2,152,394

UNITED STATES PATENT OFFICE 2,152,394

ASTRONOMICAL MIRROR

Curtis H. Veeder, Hartford, Conn.

Application February 1, 1937, Serial No. 123,457

14 Claims. (Cl. 88—105)

My invention relates to astronomical mirrors.

It has heretofore been proposed to make large astronomical mirrors of glass. This results in a very expensive and very heavy structure, difficult to make, and presenting many problems in its manufacture due to the large mass of glass required and the necessity for obtaining a perfect structure within the glass, while following high standards of precision and making due allowance for variations in temperature and the like.

My invention has for its object to provide an improved mirror especially adapted for use as an astronomical mirror and having an improved construction whereby these difficulties are overcome, and a relatively simple and inexpensive structure is provided which is at the same time adapted to function effectively for the intended purposes. A further object of my invention is to provide an improved mirror which is materially lighter than the heavy glass mirrors heretofore considered necessary, and yet of such an improved inner construction as to possess the required stiffness. Other objects are to produce such an improved structure which is also adapted to be readily and inexpensively made of metal and to be quickly responsive to changes in temperature, and one in which the structure is also such that with changes in temperature, the expansion and contraction will be uniform and symmetrical. Still further objects of my invention are to provide such a mirror having improved ventilating means, through which the air can freely circulate and which has this ventilating means provided in an improved reflector backing structure, which is of light yet strong construction and improved in such manner that the structure will expand or contract uniformly without alteration of the shape of the mirror other than a slight increase in the focal length when the temperature rises. These and other advantages of my improved construction will, however, hereafter more fully appear.

In the accompanying drawings, I have shown for purposes of illustration several embodiments which my invention may assume in practice.

In these drawings,—

Figure 1 is a plan view of one form of my improved mirror showing the reflector face thereof, a portion of the latter being broken away to facilitate illustration;

Figure 2 is a sectional view on line 2—2 of Figure 1;

Figure 3 is a fragmentary sectional view showing a modified construction wherein a reflector is provided in the form of a separate sheet;

Figure 4 is a view similar to Figure 2 showing a further modified construction;

Figures 5, 6, 7 and 8 are similar views showing still further modifications especially adapted to use in large mirrors, the sections illustrated corresponding to those in Figures 2 and 3;

Figure 9 is a fragmentary sectional view of a further modified construction, and Figures 10, 11, 12, 13, 14 and 15 are vertical sectional views similar to Figure 2 showing other modified constructions.

Referring first to the construction shown in Figures 1 and 2, it will be noted that my mirror is preferably formed of steel, such as carbon or stainless steel, or of any suitable alloy, such as Invar, or of other similar metal, such as Monel metal, the entire structure preferably being formed of metal of the same quality so that with changes in temperature, the expansion and contraction will be uniform and symmetrical.

Referring more particularly to the structure, it will be noted that the same comprises a face or mirror plate 1, shown as a concave plate in Figs. 1 and 2. Herein the latter has an axial aperture 2 therethrough and is supported at its inner periphery 3 on a cylindrical sleeve 4 and at its outer periphery 5 on a conical member 6, herein frustro-conical in form and hollow. This member 6 is in turn connected at its end of smaller diameter to the opposite end of the sleeve 4 from that supporting the inner periphery of the plate 1. In a preferred construction, the members 1 and 6 are connected together and to the sleeve 4 by welding in such manner as to produce a unitary skeleton structure with the edges all uniformly and securely united with a minimum of weight. However, it will be understood that where warping might result from the heat of welding, I contemplate the use of rivets, bolts, or other suitable connecting means to connect the parts together. Regardless of how the members 1, 4 and 6 are connected at their meeting edges, however, it is essential that there be a definite connection at these edges forming a unitary annular structure presenting at any diametrical section through the mirror a truss, the triangularly disposed members of which form a structure of known rigidity.

Attention is further directed to the fact that in the sleeve 4, any suitable number of ventilating apertures or holes 7 is provided, while any suitable number of or series of communicating holes 8 is also provided in the member 6. Thus, the two series of holes are adapted to cooperate to provide effective ventilation within the backing for the plate 1 formed by these members 4 and 6 permitting the air to circulate in such manner as to afford effective ventilation. It will be evident that these holes may be arranged in various ways, as for example, with one or more series of holes in the several members but it will be understood that I do not wish to be limited to any particular number or arrangement of holes or to any particular form of aperture.

With the outer surface of the mirror plate 1 suitably polished or covered with a suitable aluminum coating applied directly to the plate, as may be done with aluminum finishes now on the market, it will be evident that the plate 1 will provide an effective mirror surface. Also, if desired, I may use silver, chromium or other suitable highly reflective metal, as a coating. Further, it will be evident that this surface, being on a metal plate, will have very definite advantages as compared with the quick glass or quartz mirrors previously considered necessary, both as regards bulk and expense, while also having the advantage of being markedly more quickly responsive to variations in temperature. It will further be evident that by reason of my improved backing structure, this plate will be effectively supported and so supported that with changes in temperature, expansion and contraction will be uniform and symmetrical. Moreover, through the use of my improved ventilating means and the free air circulation made possible thereby, it will also be apparent that it is further made possible to avoid objectionable effects of temperature changes while enabling the whole structure to respond more quickly than a large mass of glass to variations in temperature, thus arriving quickly at a condition of stability at different temperatures encountered in service.

As shown in Figure 2, the plate 1 itself may be the reflector surface and function effectively when the unitary structure comprising this plate and the elements 4 and 6 is suitably connected in a support, as for example, peripheral and axial supports for this unit adapted to hold the structure in position while permitting the desired expansion and contraction. It will also be understood that I am not limited to the use of the plate 1 as the mirror element. Thus, for example, as shown in Figure 3, the plate 1 may form a part of the backing, or truss support, for an additional mirror plate 9 suitably supported thereon, preferably only at its axis and outer periphery. While such a plate may be attached by various means, the same is herein held in place by clamping rings 9' screwed upon extensions on the plate 1. This plate 9 may be of different material from the support and suitably attached thereto.

In Figure 4, I have illustrated a modified form of truss construction which may be used if desired. Here, it will be noted that the unit is of substantially less depth than the form of the same shown in Figure 2, and that the conical member 10 is provided with a bottom member 11 connected to the inner end of a sleeve 12, corresponding to but shorter than the sleeve 4. Moreover, it will be noted that in this construction, a reversed conical member 13 is provided, extending between the junction of the plate 1 with the sleeve 12 and the junction of the parts 10 and 11, and that this member 13 acts effectively in assisting in the support of the plate 1 while further bracing the backing structure. Also, suitably cooperating ventilating apertures 14, 15 and 16 are provided in the parts 12, 13 and 10. Here also, as in my previous construction, it will be evident that the arrangement of the air circulating means may be varied as desired, while accomplishing the purposes thereof, and it will further be understood that the plate 1 may be used as a mirror or as a support for a mirror plate 9, while the unit may be supported at suitably peripheral and axial supports as previously described.

In Figures 5 and 6, I have illustrated further modified constructions generally similar to that shown in Figure 4, but particularly adapted to use in connection with mirrors of unusually large diameter, which, by reason of their large size require a support for the plate 1 intermediate the inner and outer peripheries thereof. In the construction shown in Figure 5, it will be noted that the member 10 has a bottom member 11 as heretofore described, but that instead of a reversed conical member extending downward from the top of the sleeve 12, an upright conical member 17 extends upward from the bottom of the sleeve to a point midway between the inner and outer periphery of the member 1, where it is suitably connected thereto and to a longitudinally disposed cylindrical member 18, both being as heretofore preferably welded at their extremities to provide, at any diametrical section, a truss structure between the inner and outer peripheries of the plate 1, which structure includes the plate. Here, it will also be noted that suitable aperture means 19 are provided in the member 18 with cooperating aperture means for maintaining circulation in all the other elements of the backing member as necessary. In Figure 6, a like construction to that in Figure 5 is provided as regards the member 18 and aperture means 19, but it will be noted that a conical member 13 having aperture means 15 therein, similar to that shown in Figure 4, is provided to cooperate with the member 18, the latter thus forming the sole intermediate support for the plate 1. In both of these constructions, it will be evident that an effective intermediate support will be provided between the peripheries of the plate 1 as may be necessary in mirrors of larger size, while preserving the general features and advantages of my forms of construction previously described.

In Figures 7 and 8, I have illustrated further modifications of the above described truss structure adapted to use in connection with even larger mirrors requiring a plurality of supports intermediate the peripheries of the plate 1. Thus, in Figure 7, I have shown an outer conical member 20, generally similar to the member 6 but having a plurality of upstanding angularly disposed conical supporting members 21, 22 and 23 extending upward from a common point 24 substantially midway between the ends of the member 20 and suitably connected to that member and the plate 1 and sleeve 4, while all of these members 21, 22 and 23 are provided with suitable apertures for providing the desired air circulation. In Figure 8, it will be noted that a plurality of conical members 25, 26 and 27 corresponding generally to the member 6 previously described, is provided in conjunction with a sleeve 28 corresponding with a sleeve 4, and with suitable aperture means provided in each of these members 25, 26, 27 and 28 to permit the desired circulation, while all the members are suitably connected as for example by welding to provide my improved unitary construction.

In Figure 9, it will be noted that a cylindrical member 29 forms the external member and is used with an inner conical member 30, corresponding to the member 13. Here, it will also be evident that conical portions corresponding to the members 17 or 10 and inner cylindrical members corresponding to the members 18 may also be used if desired within such members 29 in the larger sizes. Of course, also, if desired, in small mirrors certain of the members may be integral with the plate 11, as, for example, the members 29, 11 as illustrated. It will also be understood that in certain forms of my invention, the plate 1 may be convex or flat, as illustrated in dotted lines in this figure, instead of concave, and also may omit the axial aperture shown herein or use a plate 9 without such an aperture, these forms depending upon the particular type of mirror being used and whether an axial hole is desired through which light is to be reflected down through the center hole to eye pieces or a photographic plate below the mirror illustrated herein. It will also be evident that where greater stiffness is desired, the parts of the backing may be suitably corrugated or stiffened, as by the use of corrugations running parallel to the axis in the cylindrical members and in the cones in lines intersecting the axis.

While in the forms of my invention heretofore described I have shown the conical members comprised in the truss structure in the form of frustro-conical members, it will be understood that the invention is generally applicable to conical members and not limited to use in connection with frustro-conical members. Thus, for example, in Figure 10 I have shown a conical member 31, generally corresponding to the conical member shown in Figure 2, but in the form of a cone having a closed apex 32 and cooperating with an inner hollow axially disposed member 33, generally corresponding to the member 4 shown in Figure 2, but of smaller diameter than the latter member. Here note also that I have shown a plate 34, corresponding to the plate 1, and fixed as previously described at its periphery to the upper edge of the member 31, and at its axis to the member 33; this plate 34 herein, however, being flat and having no axial aperture therein corresponding to the aperture 2 described in connection with Figure 2. Here, while a hollow member 33 is shown and is preferably provided, it will, of course, be understood that under circumstances requiring less strength a solid member 33 may be used. Also it will be noted that in the form illustrated, ventilating holes 35 and 36 corresponding to the holes 7 and 8 are also provided. In Figure 11, a further modified construction is shown wherein, while utilizing a member 31 such as just described, I have used in lieu of the member 33 of Figure 10, an inner cone 37 having its apex 38 suitably attached to the apex 32 of the member 31, and the upper periphery of the cone suitably attached to the plate 34 around the axis of the latter; ventilating apertures 39 also being provided in this member 37. In Figure 12, the structure is generally similar to that described in connection with Figure 11, save that the structure thereof is provided with a bottom member 40 and a cylindrical side wall 41; the member 40 being suitably fixed to the apex of the member 31 and the apex of the member 37 at 42, herein with the apex of the member 37 extending down through the apex of the member 31 into contact with the member 40, while the member 41 is also disposed in supporting relation beneath a flange 43 on the plate 34 and suitably attached thereto. In this form also ventilating apertures 44 are provided in the member 41. In Figure 13, I have also shown a modified construction including members 40, 41, similar to those heretofore described, but having a cone 45 having its closed upper end 46 suitably attached to the axis of the plate 34, while the opposite larger end of the member 45 is suitably fixed to the plate 40. In this construction, it will also be noted that a frustro-conical member 47 of diminishing diameter toward its lower end, supports the plate 34 adjacent the periphery of the latter and is suitably fixed thereto and to the member 41, while the end of the member 47 of smaller diameter is suitably fixed to the plate 40 and the larger end of the member 45. Here also it will be noted that ventilating apertures 48 and 49 are provided in the members 45 and 47. In Figure 14, a further modified construction is provided utilizing a cone 50, corresponding generally to the member 45 heretofore described, but inverted and fixed at its upper and lower ends to the plates 34 and 40, respectively, while a frustro-conical member 51, corresponding to the member 47 but inverted, is similarly disposed between the larger end of the member 50 and the members 40 and 41, being rigidly connected to the latter members at their junction as shown. In Figure 15, it will be noted that I have shown a cone 52, corresponding generally to the member 45 heretofore described, but smaller and associated with a plurality of cooperating frustro-conical members 53 and 54; the member 52 having its closed apex supporting and connected to the axis of the plate 34 and its base supported on and connected to the plate 40, while the frustro-conical member 53 is connected to the plate 40 and the base of the member 52, and the member 54 is connected at its base to the members 41 and 40 at their junction, similarly to the member 51 heretofore described, the two members 54 and 53 also being connected together and to the plate 34 at their upper ends, as shown at 55, in such manner as to form an annular support for the plate 34 similar to that provided by the base of the inverted conical member 50 shown in Figure 14.

In the use of these constructions shown in Figures 10–15, it will be evident that substantially the same results are obtainable as in connection with those forms shown in Figures 1 to 9 save that in Figures 10–15, no axial aperture is provided in the plate 34 or through the supporting frame, these forms being especially adapted to use where no such aperture is required. Attention here is also directed to the fact that the form shown in Figures 11–15 eliminate any need for the use of an axial cylindrical member such as shown in Figures 1–10. Also, attention is here particularly directed to the fact that such forms as shown in Figures 12–15 may, if desired, have the mirror formed on, or carried on, either their top or bottom, while still satisfactorily supporting the mirror both at its periphery and within the periphery thereof. It will, of course, also be evident that in the forms of the invention shown in Figures 13–15, the members 41 may, if desired, be omitted, and that the diameter of the plates 40 or 34 may be correspondingly reduced to the minimum diameter of the outer frustro-conical members 47, 51 and 54 associated therewith, wherever the added strength and increased diameter is not required. Although in Figures 10–15, I have shown the reflector plates 34 as flat, it will, of course, also be understood that I may, where desired, use either concave plates, such as shown in Figures 1-9, or convex plates, as also shown in dotted lines in Figure 9.

Attention is also directed to the fact that in all the illustrated forms of my improvement, an improved truss structure is provided having a wholly new truss action producing a markedly stiff structure and one effectively preventing sagging of the mirror. Attention is further directed to the improved tube structure incorporated in the mirror support, whereby distortion or warping is effectually prevented while it is made possible to utilize the strength of a hollow tube. Here attention is particularly directed to the fact that in my improved construction, it is not only made possible to obtain the triangular vertical section characteristic of a truss, but also to obtain a circular horizontal section, and to combine the effect of the truss and the tube in such manner as to give the construction the maximum stiffness. It will further be noted that at the same time that these advantages are obtained, it is made possible to produce a construction quickly responsive to changes in temperature and one wherein the results of changes in temperature will be uniform and symmetrical. Further, in all the constructions shown the supports for the mirror carrying plate are located within the lateral limits of the plate and outside the path of light reflected from the mirror. These and other advantages of my improved construction will, however, be clearly apparent to those skilled in the art.

The term "truss" as herein used has a well established meaning in structures, defining a rigid framework composed of several connected members arranged to form a triangle, or triangles, in which an external force acting on the framework at the apex of any triangle will be transmitted to the members as tension or compression forces only.

While I have herein illustrated my improved truss structure as made of metal, and such a construction is preferred, it will be understood that the various elements comprising the same may, if desired, be made of glass or porcelain elements subsequently fused together. It will also be understood that where desired, the ventilating apertures shown herein may be disposed in various other arrangements from those illustrated or may in certain instances be omitted altogether.

This application is a continuation in part of my application Serial No. 732,725, filed June 27, 1934.

While I have described a preferred form of my improved construction and various modifications thereof, it will be understood that these forms of my improvement are shown for purposes of illustration, and that the invention may be modified and embodied in various other forms without departing from its spirit or the scope of the appended claims.

What I claim as new and desire to secure by Letters Patent is:

1. A mirror for astronomical purposes comprising a truss framework triangular in section having means for transmitting to the component members thereof external forces acting on the framework at the apex of any triangle as tension or compression forces only and including a mirror carrying plate having an annular mirror carrying portion and annular angularly related supporting members for said portion disposed one within another and rigidly attached to said mirror carrying portion and to each other to form a plurality of triangles in any axial section.

2. A mirror for astronomical purposes comprising a truss framework triangular in section having means for transmitting to the component members thereof external forces acting on the framework at the apex of any triangle as tension or compression forces only and including an annular mirror carrying plate member and a support therefor, said support comprising coaxial tubular members one of which is cylindrical and the other of which is of diminishing cross section toward one end, said members at one of their ends being united with said plate at different distances from the axis of the latter and also being united with each other at their opposite ends to form a plurality of triangles in any axial section constituting the truss framework.

3. A mirror structure for astronomical purposes comprising a truss framework triangular in section having means for transmitting to the component members thereof external forces acting on the framework at the apex of any triangle as tension or compression forces only and including a series of inner and outer angularly related members forming surfaces of revolution about a vertical axis and cooperating transversely disposed annular mirror carrying plate means, said members being located outside the path of reflected light and said members and plate means having their meeting edges rigidly connected and being disposed to provide concentric circles in transverse section and in any axial section comprising a plurality of triangles.

4. A mirror structure for astronomical purposes comprising a truss framework triangular in section having means for transmitting to the component members thereof external forces acting on the framework at the apex of any triangle as tension or compression forces only and including a series of angularly related members of metal, one of which is cylindrical and another of which is of diminishing cross section toward one end, and cooperating mirror carrying metal plate means disposed transversely relative to the axis of said members, said members and plate means being rigidly connected at their intersections and both located outside the path of reflected light from the mirror carried by said plate means and so disposed as to provide concentric circles in any transverse section and a series of triangles in any axial section.

5. A mirror for astronomical purposes comprising a truss framework triangular in section having means for transmitting to the component members thereof external forces acting on the framework at the apex of any triangle as tension or compression forces only and including an annular mirror carrying plate, and a support therefor including a hollow annular member of diminishing cross section toward one end rigidly connected at one of its ends to the outer periphery of said plate, an annular member concentric with said hollow member rigidly connected to the other end of said hollow member and also rigidly connected to said plate adjacent its axis, and a cooperating angularly related annular hollow member disposed between said members and rigidly connected to said plate and to one of said members.

6. A mirror for astronomical purposes comprising a truss framework triangular in section having means for transmitting to the component members thereof external forces acting on the framework at the apex of any triangle as tension or compression forces only and including an annular mirror carrying plate of metal, and a support therefor comprising annular metal members rigidly connected thereto and including a hollow annular member of diminishing cross section toward one end rigidly connected to the outer periphery of said plate, and an inner cylindrical member concentric with said hollow member rigidly connected thereto and to said plate.

7. A mirror for astronomical purposes comprising a truss framework triangular in section having means for transmitting to the component members thereof external forces acting on the framework at the apex of any triangle as tension or compression forces only and including an annular mirror carrying plate and a support therefore including a hollow annular member of diminishing cross section toward one end rigidly connected at its larger end to the outer periphery of said plate, an inner cylindrical member concentric with said hollow member rigidly connected at one end to said plate and supporting the latter adjacent its axis, and a second cylindrical member rigidly connected to said hollow member and said plate and concentric therewith and supporting said plate between said hollow member and said inner cylindrical member.

8. A mirror for astronomical purposes comprising a truss framework triangular in section having means for transmitting to the component members thereof external forces acting on the framework at the apex of any triangle as tension or compression forces only and including an upper annular metal reflector carrying plate and an annular base plate having coaxial apertures, and means forming with said plates a plurality of triangles in any diametrical section including spaced cylindrical plate-supporting members of metal rigidly connected at their opposite ends with said plates and each supporting said reflector carrying plate at different distances from the axis of said apertures and an annular member of diminishing cross section toward one end rigidly connected at its opposite ends to opposite ends of said cylindrical members.

9. A mirror for astronomical purposes including a supporting structure constituting a truss framework having means for transmitting external forces acting on the framework as tension or compression forces only to the component members thereof and comprising an annular reflector carrying plate and coaxial annular plate supporting members rigidly attached to said plate and supporting said plate, one adjacent the axis of said plate and the other adjacent its outer periphery, and having rigid annular supplemental supporting means each rigidly attached at one end to one of said supporting members and rigidly attached at their opposite ends to said plate between said axial and peripheral supporting members.

10. A unitary mirror structure for astronomical purposes comprising a truss framework triangular in section having means for transmitting to the component members thereof external forces acting on the framework at the apex of any triangle as tension or compression forces only and including an annular reflector carrying plate, and annular plate supporting members each rigidly united at one end with said plate and supporting said plate, one adjacent its axis and the other adjacent its outer periphery, and having supplemental plate supporting means supporting said plate between said axial and peripheral supporting members comprising a cylindrical member and a cooperating annular member of diminishing cross section toward one end, both of said cooperating members being rigidly attached at one of their ends to said plate and each at its opposite end to one of said plate supporting members.

11. A mirror structure for astronomical purposes comprising a truss framework triangular in section having means for transmitting to the component members thereof external forces acting on the framework at the apex of any triangle as tension or compression forces only and including an annular reflector carrying plate and annular plate supporting means rigidly connected with said plate between its axis and outer periphery comprising a plurality of annular members of diminishing cross section toward one end located one within the other and having similar ends thereof rigidly connected with said plate at spaced points between its axis and outer periphery, a cooperating inner axial member, and an annular outer member of diminishing cross section toward one end rigidly connected to all of said members and to said plate 12. A mirror support for astronomical mirrors comprising transversely disposed plate means, and supporting means for said plate means located outside the path of reflected light cooperating with said plate means to form a truss structure having means for transmitting external forces acting on the structure as tension or compression forces only to the component members thereof, said supporting means forming concentric circles in any transverse section and a series of triangles in any axial section and including a conical member having its annular edge fixed to said plate, and an annular member within said conical member and fixed thereto and to said plate.

13. A mirror support for astronomical mirrors comprising transversely disposed plate means and supporting means therefor cooperating therewith to form a truss structure having means for transmitting external forces acting on the structure as tension or compression forces only to the component members thereof, said supporting means forming concentric circles in any transverse section and a series of triangles in any axial section and including a conical member fixed at one end to said plate, and an angularly related conical member within said conical member and fixed thereto and to said plate, said first mentioned member being frustro-conical and said inner member having one end connected to said frustro-conical member and the other end connected to said plate.

14. A mirror support for astronomical mirrors comprising transversely disposed plate means, and supporting means for said plate means located outside the path of reflected light and cooperating with said plate means to form a truss structure having means for transmitting external forces acting on the structure as tension or compression forces only to the component members thereof, said supporting means forming concentric circles in parallel transverse sections and identical triangles in different diametric vertical sections.

CURTIS H. VEEDER.